(12) United States Patent
Orlando et al.

(10) Patent No.: US 7,096,674 B2
(45) Date of Patent: Aug. 29, 2006

(54) HIGH THRUST GAS TURBINE ENGINE WITH IMPROVED CORE SYSTEM

(75) Inventors: Robert Joseph Orlando, West Chester, OH (US); Kattalaicheri Srinivasan Venkataramani, West Chester, OH (US); Ching-Pang Lee, Cincinnati, OH (US); Thomas Ory Moniz, Loveland, OH (US); Kurt David Murrow, Indian Springs, OH (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 10/941,546

(22) Filed: Sep. 15, 2004

(65) Prior Publication Data

US 2006/0053800 A1    Mar. 16, 2006

(51) Int. Cl.
*F02C 6/08* (2006.01)

(52) U.S. Cl. .................. 60/782; 60/226.1; 60/726; 60/806

(58) Field of Classification Search ............ 60/226.1, 60/262, 263, 269, 782, 785, 726, 806, 247, 60/268, 773, 792, 39.162, 795, 39.38, 39.76
See application file for complete search history.

(56) References Cited

U.S. PATENT DOCUMENTS

| | | | | |
|---|---|---|---|---|
| 3,673,802 A | * | 7/1972 | Krebs et al. ............... | 60/226.1 |
| 3,705,492 A | * | 12/1972 | Vickers .................... | 60/39.511 |
| 3,877,219 A | | 4/1975 | Hagen ....................... | 60/39.38 |
| 3,986,347 A | * | 10/1976 | Schirmer .................... | 60/772 |
| 4,296,599 A | * | 10/1981 | Adamson .................... | 60/39.23 |
| 4,896,499 A | * | 1/1990 | Rice .......................... | 60/792 |
| 5,247,792 A | | 9/1993 | Coffinberry ............... | 60/39.463 |
| 5,579,631 A | * | 12/1996 | Chen et al. ................. | 60/775 |
| 5,782,076 A | * | 7/1998 | Huber et al. ................ | 60/782 |
| 5,802,841 A | * | 9/1998 | Maeda ........................ | 60/784 |
| 5,805,973 A | | 9/1998 | Coffinberry et al. ........ | 428/551 |

(Continued)

*Primary Examiner*—William H. Rodriguez
(74) *Attorney, Agent, or Firm*—William Scott Andes; James P. Davidson

(57) ABSTRACT

A gas turbine engine having a longitudinal centerline axis therethrough, including: a fan section at a forward end of the gas turbine engine including at least a first fan blade row connected to a first drive shaft; a booster compressor positioned downstream of and in at least partial flow communication with the fan section including a plurality of stages, each stage including a stationary compressor blade row and a rotating compressor blade row connected to a drive shaft and interdigitated with the stationary compressor blade row; a core system positioned downstream of the compressor, where the core system further includes an intermediate compressor positioned downstream of and in flow communication with the booster compressor, the intermediate compressor being connected to a second drive shaft, and a combustion system for producing pulses of gas having increased pressure and temperature from a fluid flow provided to an inlet thereof so as to produce a working fluid at an outlet; and, a low pressure turbine positioned downstream of and in flow communication with the core system, the low pressure turbine being utilized to power the first drive shaft. The core system may also include an intermediate turbine positioned downstream of the combustion system in flow communication with the working fluid, where the intermediate turbine is utilized to power the second drive shaft. A first source of compressed air having a predetermined pressure is provided to the combustion system inlet and a second source of compressed air having a pressure greater than the first source of compressed air is provided to cool the combustion system.

28 Claims, 3 Drawing Sheets

U.S. PATENT DOCUMENTS

| | | | |
|---|---|---|---|
| 5,960,625 A | 10/1999 | Zdvorak, Sr. | 60/39.34 |
| 6,089,010 A * | 7/2000 | Gross | 60/782 |
| 6,298,656 B1 * | 10/2001 | Donovan et al. | 60/39.182 |
| 6,453,659 B1 * | 9/2002 | Van Liere et al. | 60/39.53 |
| 6,481,212 B1 * | 11/2002 | Priestley | 60/782 |
| 6,487,863 B1 * | 12/2002 | Chen et al. | 60/782 |
| 6,532,744 B1 * | 3/2003 | Reiter et al. | 60/782 |
| 6,536,205 B1 * | 3/2003 | Sugishita et al. | 60/39.52 |
| 6,574,966 B1 * | 6/2003 | Hidaka et al. | 60/806 |
| 6,584,779 B1 * | 7/2003 | Priestley | 60/782 |
| 6,691,503 B1 * | 2/2004 | Tiemann | 60/39.17 |
| 6,775,986 B1 * | 8/2004 | Ganz et al. | 60/773 |
| 6,817,187 B1 * | 11/2004 | Yu | 60/774 |
| 6,840,049 B1 * | 1/2005 | Ziegner | 60/782 |
| 2003/0000222 A1 * | 1/2003 | Tsuji | 60/785 |
| 2003/0046938 A1 * | 3/2003 | Mortzheim et al. | 60/782 |
| 2003/0101727 A1 * | 6/2003 | Yamanaka et al. | 60/726 |
| 2004/0040309 A1 * | 3/2004 | Ziegner | 60/772 |
| 2004/0088995 A1 * | 5/2004 | Reissig | 60/772 |
| 2004/0112057 A1 * | 6/2004 | Bruck et al. | 60/723 |
| 2004/0123583 A1 * | 7/2004 | Nordeen et al. | 60/226.1 |
| 2004/0123602 A1 * | 7/2004 | Bunker et al. | 60/782 |
| 2005/0000205 A1 * | 1/2005 | Sammann et al. | 60/226.1 |

* cited by examiner

HIGH THRUST GAS TURBINE ENGINE WITH IMPROVED CORE SYSTEM

BACKGROUND OF THE INVENTION

The present invention relates generally to a high thrust gas turbine engine design and, in particular, to an improved core system which replaces the high pressure system of conventional gas turbine engines. An intermediate compressor of the gas turbine engine is associated with the core system to provide additional thrust while mitigating various effects from the combustion system so as to retain a low pressure turbine having a conventional design.

It is well known that typical gas turbine engines are based on the ideal Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such gas turbine engines generally rely upon deflagrative combustion to burn a fuel/air mixture and produce combustion gas products which travel at relatively slow rates and relatively constant pressure within a combustion chamber. While engines based on the Brayton Cycle have reached a high level of thermodynamic efficiency by steady improvements in component efficiencies and increases in pressure ratio and peak temperature, further improvements are becoming increasingly more difficult to obtain.

Although the combustors utilized in the conventional gas turbine engine are the type where pressure therein is maintained substantially constant, improvements in engine cycle performance and efficiency have been obtained by operating the engine so that the combustion occurs as a detonation in either a continuous or pulsed mode.

Several pulse detonation system designs, for example, have been disclosed by the assignee of the present invention in the following patent applications: (1) "Pulse Detonation Device For A Gas Turbine Engine," having Ser. No. 10/383,027; (2) "Pulse Detonation System For A Gas Turbine Engine," having Ser. No. 10/405,561; (3) "Integral Pulse Detonation System For A Gas Turbine Engine" having Ser. No. 10/418,859; (4) "Rotating Pulse Detonation System For A Gas Turbine Engine" having Ser. No. 10/422,314; and, (5) "Rotary Pulse Detonation System With Aerodynamic Detonation Passages For Use In A Gas Turbine Engine" having Ser. No. 10/803,293.

It will be appreciated that a pulse detonation device produces pulses of hot gas that are of approximately the same pressure. Time averaged pressure of such pulses are similar in magnitude to the pressure generated in a typical low pressure turbine engine, but at a higher temperature than normally associated with the low pressure turbine engine. It will be understood that a constant volume combustor similarly produces pulses of high-pressure, high-temperature gas that can also be utilized in the pulse detonation type of arrangement. An example of a stationary constant volume combustor is disclosed in U.S. Pat. No. 3,877,219 to Hagen, while a constant volume combustor including a rotatable element is disclosed in U.S. Pat. No. 5,960,625 to Zdvorak, Sr.

In this way, the core or high pressure system of the conventional gas turbine engine may be replaced with a more efficient and less complicated system involving a different type of combustor. At the same time, the modified gas turbine engine will be able to retain the conventional low pressure turbine, as well as the conventional operability characteristics thereof. In order to provide additional thrust over the gas turbine engine disclosed in a patent application entitled, "Gas Turbine Engine Having Improved Core System," Ser. No. 10/941,508, which is also owned by the assignee of the present invention and filed concurrently herewith, certain modifications have become necessary.

Accordingly, it would be desirable for a practical overall architecture be developed for a gas turbine engine utilizing a pulse detonation device or a constant volume combustor in order to further improve overall engine efficiency. Further, it would be desirable for such architecture to incorporate a cooling system and method which mitigates the pulsing nature of the combustion discharge and reduces engine noise. At the same time, it is also desirable for such gas turbine engine to produce thrust in a higher range.

BRIEF SUMMARY OF THE INVENTION

In accordance with a first embodiment of the present invention, a gas turbine engine having a longitudinal centerline axis therethrough is disclosed as including: a fan section at a forward end of the gas turbine engine including at least a first fan blade row connected to a first drive shaft; a booster compressor positioned downstream of and in at least partial flow communication with the fan section including a plurality of stages, each stage including a stationary compressor blade row and a rotating compressor blade row connected to a drive shaft and interdigitated with the stationary compressor blade row; a core system positioned downstream of the booster compressor, where the core system further includes an intermediate compressor positioned downstream of and in flow communication with the booster compressor, the intermediate compressor being connected to a second drive shaft, and a combustion system for producing pulses of gas having increased pressure and temperature from a fluid flow provided to an inlet thereof so as to produce a working fluid at an outlet; and, a low pressure turbine positioned downstream of and in flow communication with the core system, the low pressure turbine being utilized to power the first drive shaft. A first source of compressed air having a predetermined pressure is provided to the combustion system inlet and a second source of compressed air having a pressure greater than the first source of compressed air is provided to cool the combustion system. An intermediate turbine may be positioned downstream of the combustion system in flow communication with the working fluid, where the intermediate turbine is utilized to power the second drive shaft.

In accordance with a second embodiment of the present invention, a method of cooling a combustion system of a gas turbine engine including a booster compressor and an intermediate compressor, wherein the combustion system produces pulses of gas having increased pressure and temperature from a fluid flow provided thereto, is disclosed as including the following steps: providing a first source of compressed air having a predetermined pressure to the combustion system; and, providing a second source of compressed air having a pressure greater than the first source of compressed air to cool the combustion system.

In accordance with a third embodiment of the present invention, a gas turbine engine is disclosed as including: a compressor positioned at a forward end of the gas turbine engine having a plurality of stages, each stage including a stationary compressor blade row and a rotatable blade row connected to a first drive shaft and interdigitated with the first compressor blade row; a core system positioned downstream of the compressor, where the core system further includes an intermediate compressor positioned downstream of and in flow communication with the compressor connected to a second drive shaft and a combustion system for producing pulses of gas having increased pressure and temperature from a fluid supplied to an inlet thereof so as to produce a working fluid at an outlet; a low pressure turbine downstream of and in flow communication with the intermediate turbine for powering the first drive shaft; and, a load connected to the first drive shaft. An intermediate turbine may be positioned downstream of the combustion system in flow communication with the working fluid, where the intermediate turbine is utilized to power the second drive shaft. A first source of compressed air having a predetermined pressure is provided to the combustion system and a second source of compressed air having a pressure greater than compressed air from the first source is provided to cool the combustion system.

DETAILED DESCRIPTION OF THE INVENTION

Figure 1:
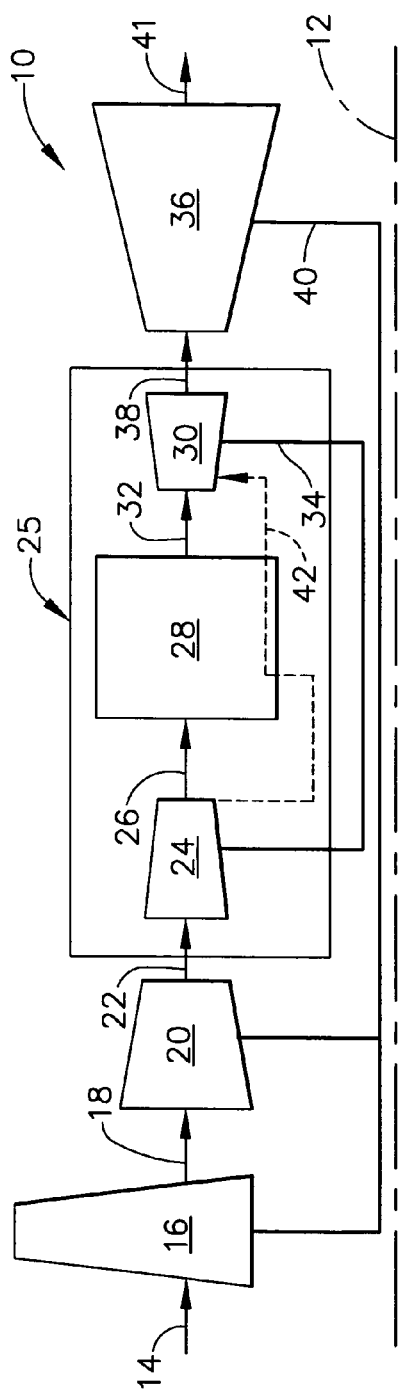
FIG. 1 is a diagrammatic view of a gas turbine engine configuration including a prior art core system, where a system of cooling is depicted therein.

Referring now to the drawings in detail, wherein identical numerals indicate the same elements throughout the figures, FIG. 1 diagrammatically depicts a conventional gas turbine engine 10 (high bypass type) utilized with aircraft having a longitudinal or axial centerline axis 12 therethrough for reference purposes. A flow of air (represented by arrow 14) is directed through a fan section 16, with a portion thereof (represented by arrow 18) being provided to a booster compressor 20. Thereafter, a first compressed flow (represented by arrow 22) is provided to a core or high pressure system 25.

More specifically, core system 25 includes a high pressure compressor 24 which supplies a second compressed flow 26 to a combustor 28. It will be understood that combustor 28 is of the constant pressure type which is well known in the art. A high pressure turbine 30 is positioned downstream of combustor 28 and receives gas products (represented by arrow 32) produced by combustor 28 and extracts energy therefrom to drive high pressure compressor 24 by means of a first or high pressure drive shaft 34. It will further be understood that high pressure compressor 24 not only provides second compressed flow 26 to an inlet of combustor 28, but also may provide a cooling flow (represented by dashed arrow 42) to combustor 28.

A low pressure turbine 36 is located downstream of core system 25 (i.e., high pressure turbine 30), where gas products (represented by arrow 38) flow therein and energy is extracted to drive booster compressor 20 and fan section 16 via a second or low pressure drive shaft 40. The remaining gas products (represented by arrow 41) then exit gas turbine engine 10. It will be appreciated that fan section 16 generally includes at least one row of fan blades connected to second drive shaft 40. It will also be understood that booster compressor 20 and high pressure compressor 24 preferably include a plurality of stages, where each stage of booster compressor 20 includes a stationary compressor blade row and a rotating compressor blade row connected to second drive shaft 40 and interdigitated with the stationary compressor bade row.

Figure 2:
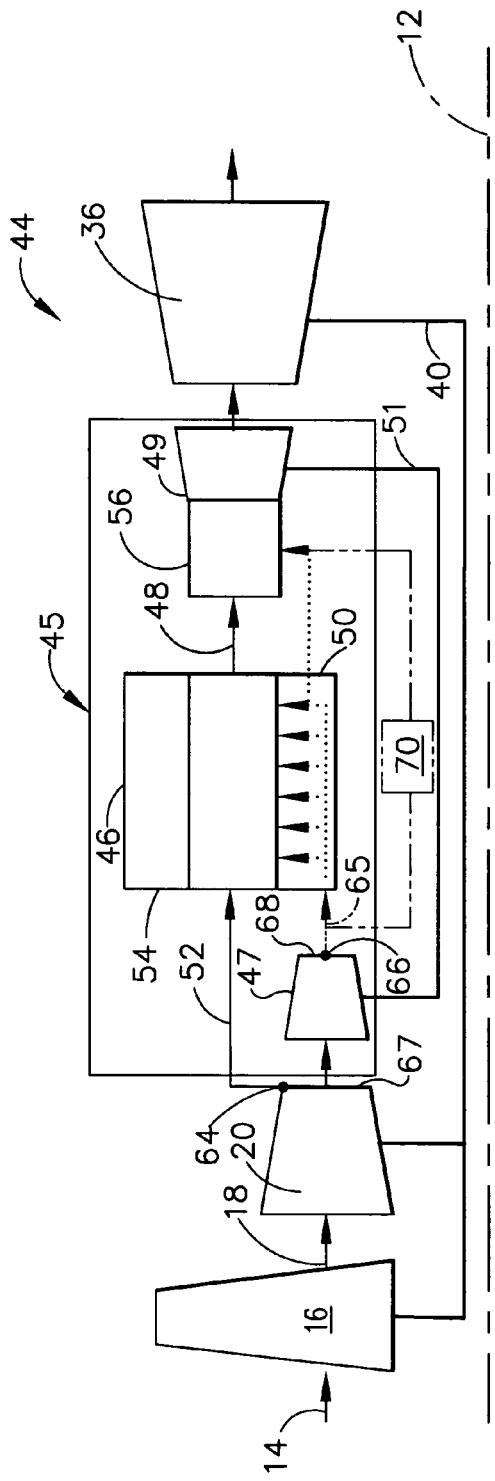
FIG. 2 is a diagrammatic view of a gas turbine engine configuration including a core system in accordance with the present invention having a stationary combustion device, where a system of cooling is shown as being integrated therewith.

As seen in FIG. 2, gas turbine engine 44 similarly includes longitudinal centerline axis 12, air flow 14 to fan section 16, air flow 18 to booster compressor 20, and low pressure drive shaft 40 through which low pressure turbine 36 drives fan section 16 and booster compressor 20. Gas turbine engine 44, however, includes a new core system 45 which preferably includes an intermediate compressor 47 in flow communication with booster compressor 20 and a combustion system 46. Although not required in all configurations of gas turbine engine 44, it is preferred that an intermediate turbine 49 also be provided in flow communication with combustion system 46. Combustion system 46, which may be either a constant volume type combustor or a pulse detonation system, produces a working fluid (represented by arrow 48) consisting of gas pulses at an outlet 50 having increased pressure and temperature from an air flow (represented by arrow 52) supplied to an inlet 54 thereof. Contrary to combustor 28 utilized in core system 25 described hereinabove, combustion system 46 does not maintain a relatively constant pressure therein. Moreover, core system 45 operates substantially according to an ideal Humphrey cycle instead of the ideal Brayton cycle in core system 25.

Where combustion system 46 does not include a rotatable member, it will be seen that gas pulses 48 are preferably provided to a turbine nozzle 56 positioned immediately upstream of intermediate turbine 49 so as to direct its flow at an optimum orientation therein. Intermediate turbine 49 then operates to power a second drive shaft 51 which drives intermediate compressor 47. As seen in FIG. 2, low pressure turbine 36 drives both fan section 16 and booster compressor 20 by means of drive shaft 40. It will be noted in an alternative configuration depicted in FIG. 3, however, that second drive shaft 51 operates to drive booster compressor 20 and intermediate compressor 47. In this way, low pressure turbine 36 is able to separately drive fan section 16 via drive shaft 40.

Where a combustion system includes a rotatable member (see FIG. 4), it may be utilized to power intermediate compressor 47 (and possibly booster compressor 20) by means of a drive shaft 53. It will be noted that the line representing drive shaft 53 is extended in phantom to indicate an optional connection to booster compressor 20. Clearly, intermediate turbine 49 is preferably omitted in this configuration so that working fluid 48 flows to a turbine nozzle 55 immediately upstream of low pressure turbine 36. Depending on whether drive shaft 53 is connected only to intermediate compressor 47 alone or both intermediate compressor 47 and booster compressor 20, low pressure turbine 36 will power both fan 16 and booster compressor 20 or fan 16 alone via drive shaft 40.

Figure 3:
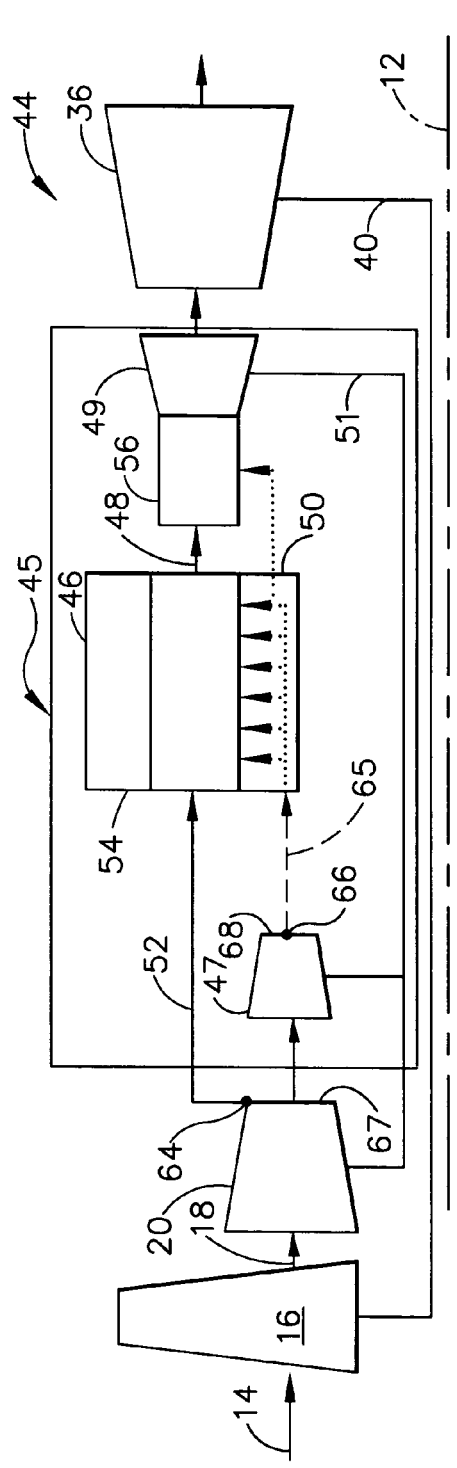
FIG. 3 is a diagrammatic view of the gas turbine engine configuration depicted in FIG. 2 including an alternative shafting arrangement.
Figure 4:
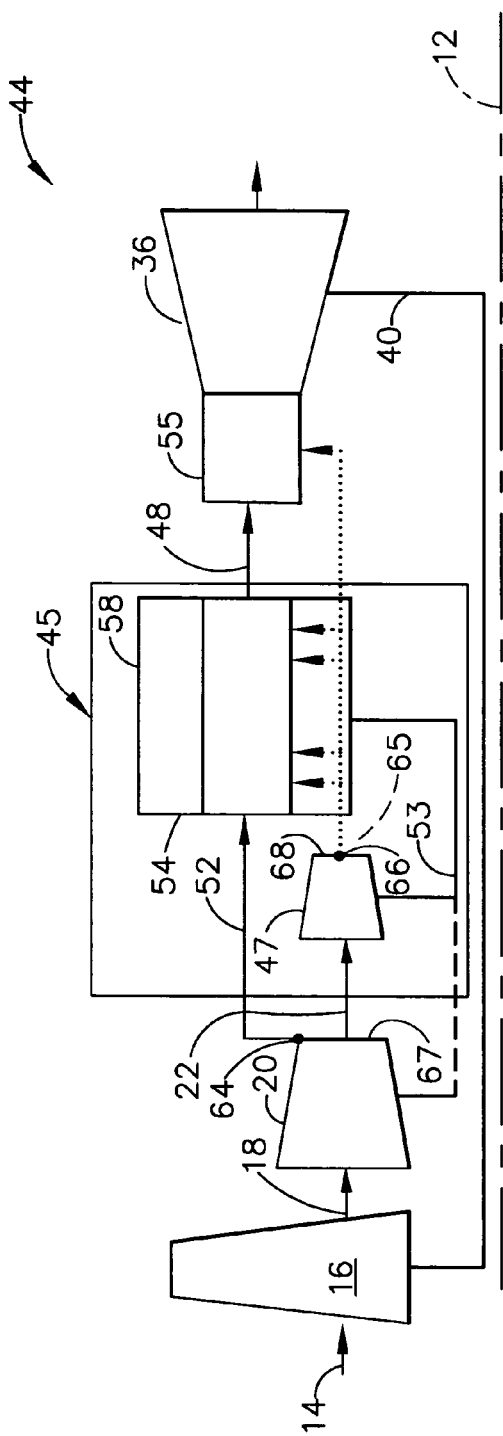
FIG. 4 is a diagrammatic view of the gas turbine engine configuration depicted in FIG. 2 including a core system in accordance with the present invention having a rotating combustion device, where a system of cooling is shown as being integrated therewith.

Further, it will be seen from FIGS. 2–4 that a first source 64 from booster compressor 20 preferably provides compressed air 52 to inlet 54 of combustion systems 46 and 58, while a second source 66 from intermediate compressor 47 preferably provides compressed air 65 to turbine nozzles 56 and 55 in order to attenuate the pulsating nature of working fluid 48 and reduce the temperature thereof to an acceptable level for intermediate turbine 49 (if applicable) and low pressure turbine 36. In this way, any related noise is mitigated and smooth operation of gas turbine engine 44 is enabled. Second compressed air 65 also may be utilized to provide cooling to combustion systems 46 and 58, which preferably will take the form of impingement and/or convection cooling. In addition, a small portion of second compressed air 65 may be used to provide improved atomization of fuel provided to combustion systems 46 and 58.

It will be appreciated that first compressed air source 64 preferably originates from a valve or port in a mid-stage or at an aft end of booster compressor 20 which is located upstream of second compressed air source 66. Since compressed air 65 from second source 66 has preferably experienced the stages of booster compressor 20, as well as the stages of intermediate compressor 47, compressed air 65 from second source 66 will necessarily have a higher pressure than compressed air 52 from first source 64. It is preferred that the pressure of compressed air 65 from second source 66 be greater than the pressure of compressed air 52 from first source 64 by at least approximately 20%. More preferably, the pressure differential between compressed air 65 of second source 66 and compressed air 52 of first source 64 is at least approximately 50%, and optimally such pressure differential is at least approximately 100%. To effect the desired pressure differential between compressed air 52 and 65 of first and second compressed air sources 64 and 66, respectively, it is preferred that first source 64 originate at an aft end 67 of booster compressor 20 and that second source 66 originate at an aft end 68 of intermediate compressor 47.

It will further be appreciated that compressed air 65 from second source 66 provided to turbine nozzles 56 and 55 preferably has a greater pressure than working fluid 48 provided at combustion system outlet 50. In this way, such compressed air 65 is able to be introduced to combustion system 46 even though the pressure of compressed air 52 from first source 64 is increased therein. To increase the cooling effectiveness of compressed air 65 from second source 66, a heat exchanger 70 may optionally be employed in series therewith (as shown in phantom in FIG. 2). With regard to gas turbine engine 44 and core system 45 utilized therein, the maximum amount of thrust generated, without additional modifications, is believed to be approximately 60,000 pounds or approximately 2–3 times the gas turbine engine disclosed in the 'current patent application without such an intermediate compressor. Even so, the practical effects of substituting core system 45 for high pressure core system 25 of conventional gas turbine engine 10 include the simpler and more efficient operation of gas turbine engine 44. At the same time, the design and materials of conventional low pressure turbine 36 can be retained so that exotic, expensive materials can be avoided.

The present invention also contemplates a method of cooling combustion systems 46 and 58 of gas turbine engine 44, where booster compressor 20 includes a plurality of stages and working fluid 48 is discharged from such combustion systems. This method includes the steps of providing compressed air 52 from first source 64 in booster compressor 20 to combustion system 46 (or combustion system 58) and providing compressed air 65 from second source 66 in intermediate compressor 47 to cool such respective combustion system. It will be understood that the pressure of compressed air 65 from second source 66 is greater than the pressure of compressed air 52 from first source 64 by a predetermined amount as discussed hereinabove. The method further may include the steps of originating first compressed air source 64 from a first point located at aft end 67 of booster compressor 20 and originating second compressed air source 66 from a second point located downstream of the first point. The method more specifically involves the step of providing compressed air 65 from second source 66 to either an initial stage of intermediate turbine 49 or turbine nozzles 56 and 55 as explained herein. To increase the effectiveness of compressed air 65 from second source 66, an additional step may include cooling such compressed air 65 prior to providing it to combustion systems 46 or 58 (e.g., by introducing compressed air 65 to heat exchanger 70).

Figure 5:
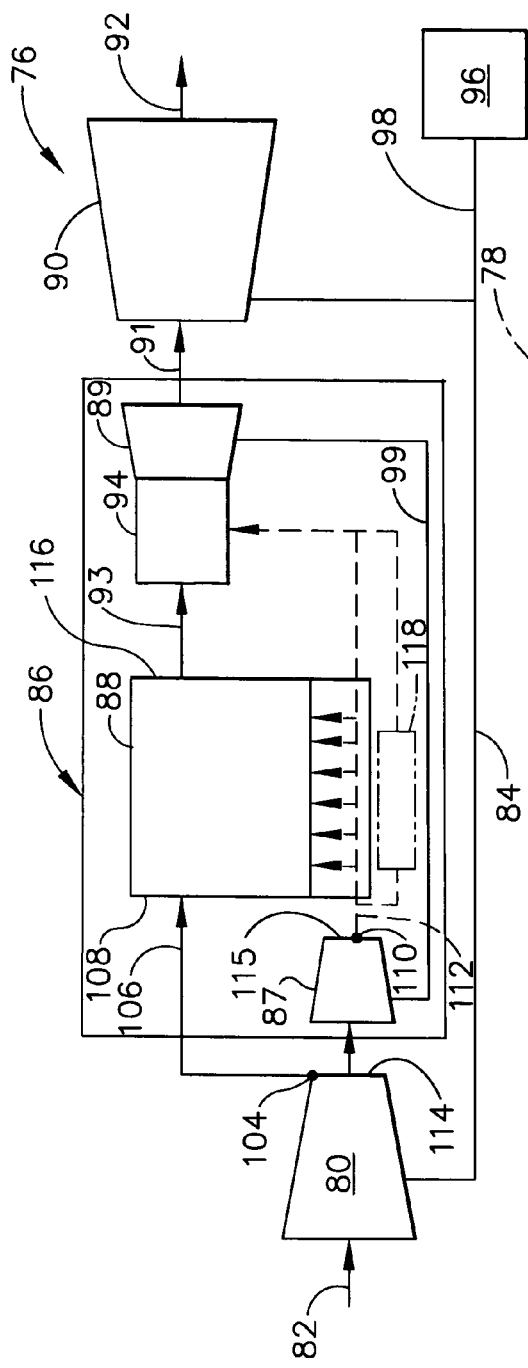
FIG. 5 is a diagrammatic view of an alternative gas turbine engine configuration including a core system in accordance with the present invention having a stationary combustion device, where a system of cooling is shown as being integrated therewith; and, FIG. 6 is a diagrammatic view of the gas turbine engine configuration depicted in FIG. 5 including a core system in accordance with the present invention having a rotating combustion device, where a system of cooling is shown as being integrated therewith.

FIG. 5 depicts an alternative gas turbine engine 76 for use in industrial and other shaft power applications (e.g., marine or helicopter propulsion) as having a longitudinal centerline axis 78. As seen therein, gas turbine engine 76 includes a compressor 80 in flow communication with a flow of air (represented by an arrow 82). Compressor 80 preferably includes at least a first stationary compressor blade row and a second compressor blade row connected to a first drive shaft 84 and interdigitated with the first compressor blade row. Additional compressor blade rows may be connected to drive shaft 84, with additional stationary compressor blade rows interdigitated therewith. An inlet guide vane (not shown) may be positioned at an upstream end of compressor 80 to direct the flow of air therein. A core system 86 having an intermediate compressor 87, a stationary combustion system 88, and an intermediate turbine 89 like that described hereinabove with respect to FIGS. 2 and 3, provides a working fluid 91 to low pressure turbine 90 that powers first drive shaft 84. Combustion gases (represented by an arrow 92) then exit from low pressure turbine 90 and are exhausted.

It will be seen that a working fluid 93 is preferably provided to a turbine nozzle 94 positioned immediately upstream of intermediate turbine 89 so as to direct its flow at an optimum orientation into intermediate turbine 89. In the embodiment depicted in FIG. 5, low pressure turbine 90 drives both compressor 80 by means of first drive shaft 84 and a load 96 by means of a second drive shaft 98, whereas intermediate turbine 89 drives a third drive shaft 99 which powers intermediate compressor 87.

Figure 6:
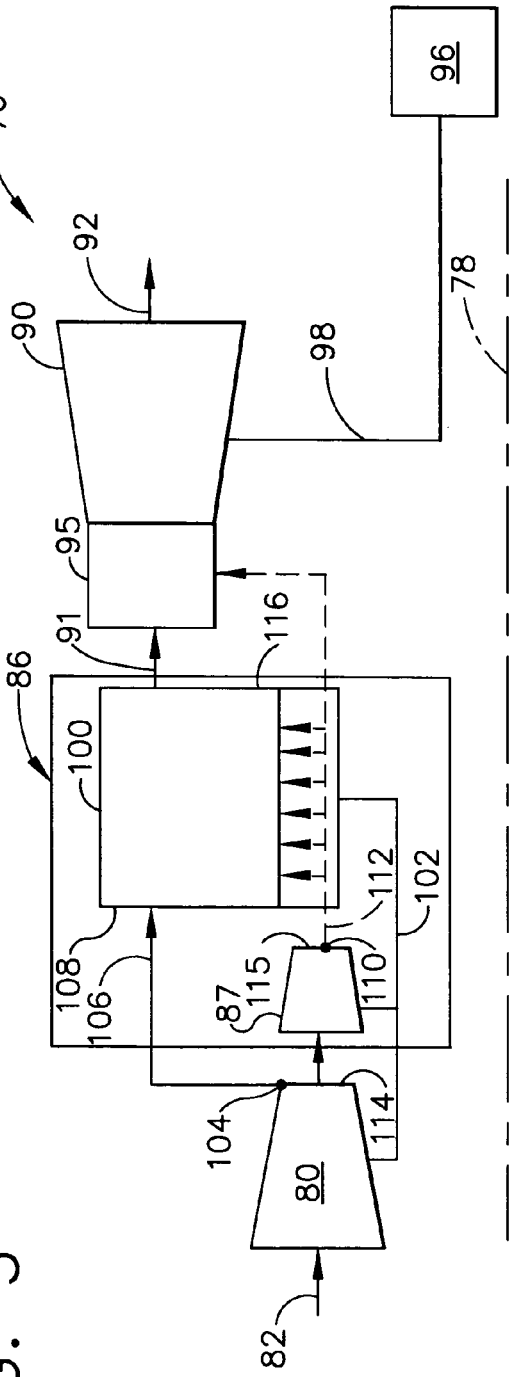

In an alternative configuration depicted in FIG. 6, it will be noted that combustion system 100 includes at least one rotatable member associated therewith which operates a first drive shaft 102 that preferably drives intermediate compressor 87 and possibly compressor 80. Depending upon the shafting arrangement employed, low pressure turbine 90 is able to separately drive load 96 via second drive shaft 98 and no intermediate turbine is required. A turbine nozzle 95 is positioned immediately upstream of low pressure turbine 90 to direct the flow of working fluid 93 therein.

Further, it will be seen from FIGS. 5 and 6 that a first source 104 from compressor 80 provides compressed air 106 to inlet 108 of combustion systems 88 and 100, while a second source 110 from intermediate compressor 87 preferably provides compressed air 112 to turbine nozzles 94 and 95 in order to attenuate the pulsating nature of working fluid 93 or working fluid 91 and reduce the temperature thereof to an acceptable level for low pressure turbine 90. In this way, any related noise is mitigated and smooth operation of gas turbine engine 76 is enabled. Second compressed air 112 also may be utilized to provide cooling to combustion systems 88 and 100, which may take the form of impingement and/or convection cooling. In addition, a small portion of second compressed air 112 may be used to provide improved atomization of fuel provided to combustion systems 88 and 100.

It will be appreciated that first compressed air source 104 preferably originates from a valve or port in a mid-stage or an aft end of compressor 80 which is located upstream of second compressed air source 110. Since the air from second source 110 has preferably experienced more stages of compression than first source 104, compressed air 112 from second source 110 will necessarily have a higher pressure than compressed air 106 from first source 104. It is preferred that the pressure of compressed air 112 from second source 110 be greater than the pressure of compressed air 106 from first source 104 by at least approximately 20%. More preferably, the pressure differential between compressed air 112 of second source 110 and compressed air 106 from first source 104 is at least approximately 50%, and optimally such pressure differential is at least 100%. To effect the desired pressure differential between compressed air 106 and 112 of first and second compressed air sources 104 and 110, respectively, it is preferred that first source 104 originate at an aft end 114 of compressor 80 and that second source 110 originate at an aft end 115 of intermediate compressor 87.

It will further be appreciated that compressed air 112 from second source 110 provided to turbine nozzles 94 and 95 preferably has a greater pressure than working fluid 93 provided at combustion system outlet 116. In this way, such compressed air 112 is able to be introduced to combustion systems 88 and 100 even though the pressure of compressed air 106 from first source 104 is increased therein. To increase the cooling effectiveness of compressed air 112 from second source 110, a heat exchanger 118 may optionally be employed in series therewith (as shown in phantom in FIG. 5).

Having shown and described the preferred embodiment of the present invention, further adaptations of core systems 45 and 86, and particularly combustion systems 46, 58, 88 and 100 can be accomplished by appropriate modifications by one of ordinary skill in the art without departing from the scope of the invention. Moreover, it will be understood that combustion systems 46, 58, 88 and 100 may be utilized with other types of gas turbine engines not depicted herein.

What is claimed is:

1. A gas turbine engine having a longitudinal centerline axis therethrough, comprising:
    (a) a fan section at a forward end of said gas turbine engine including at least a first fan blade row connected to a first drive shaft;
    (b) a booster compressor positioned downstream of and in at least partial flow communication with said fan section including a plurality of stages, each said stage including a stationary compressor blade row and a rotating compressor blade row connected to said first drive shaft and interdigitated with said stationary compressor blade row;
    (c) a core system positioned downstream of said booster compressor, said core system further comprising:
        (1) an intermediate compressor positioned downstream of and in flow communication with said booster compressor, said intermediate compressor being connected to a second drive shaft; and,
        (2) a combustion system for producing pulses of gas having increased pressure and temperature from a fluid flow provided to an inlet thereof so as to produce a working fluid at an outlet; and,
    (d) a low pressure turbine positioned downstream of and in flow communication with said core system, said low pressure turbine being utilized to power said first drive shaft;

wherein a first source of compressed air having a predetermined pressure is provided to said combustion system inlet and a second source of compressed air having a pressure greater than said first source of compressed air is provided to cool said combustion system.

2. The gas turbine engine of claim 1, wherein pressure of compressed air from said second source is greater than pressure of compressed air from said first source by at least approximately 20%.

3. The gas turbine engine of claim 1, wherein pressure of compressed air from said second source is greater than pressure of compressed air from said first source by at least approximately 50%.

4. The gas turbine engine of claim 1, wherein pressure of compressed air from said second source is greater than pressure of compressed air from said first source by at least approximately 100%.

5. The gas turbine engine of claim 1, wherein said first source of compressed air originates in said booster compressor.

6. The gas turbine engine of claim 1, wherein said first source of compressed air originates between adjacent stages of said intermediate compressor.

7. The gas turbine engine of claim 1, wherein said second source of compressed air originates at an aft end of said intermediate compressor.

8. The gas turbine engine of claim 1, wherein said second source of compressed air originates from said intermediate compressor.

9. The gas turbine engine of claim 1, wherein pressure of compressed air from said second source is greater than pressure of working fluid at said combustion system outlet.

10. The gas turbine engine of claim 1, wherein said combustion system is a constant volume combustor.

11. The gas turbine engine of claim 1, wherein said combustion system is a pulse detonation device.

12. The gas turbine engine of claim 1, wherein said combustion system includes at least one rotating member for powering said second drive shaft.

13. The gas turbine engine of claim 12, wherein said rotating member of said combustion system powers said second drive shaft.

14. The gas turbine engine of claim 1, wherein said combustion system includes no rotating members.

15. The gas turbine engine of claim 14, further comprising an intermediate turbine positioned downstream of said combustion system in flow communication with said working fluid, said intermediate turbine being utilized to power said second drive shaft.

16. The gas turbine engine of claim 1, wherein said booster compressor is driven by said first drive shaft.

17. The gas turbine engine of claim 1, wherein said booster compressor is driven by said second drive shaft.

18. The gas turbine engine of claim 1, wherein compressed air from said second source is provided to cool fluid entering said intermediate turbine.

19. The gas turbine engine of claim 1, wherein a portion of compressed air from said second source is supplied to said combustion system to assist atomization of fuel therein.

20. The gas turbine engine of claim 1, further comprising a heat exchanger in flow communication with said compressed air of said second source.

21. The gas turbine engine of claim 1, wherein said gas turbine engine is able to generate a maximum of approximately 60,000 pounds of thrust.

22. A method of cooling a combustion system of a gas turbine engine including a booster compressor and an intermediate compressor, wherein said combustion system produces pulses of gas having increased pressure and temperature from a fluid flow provided thereto, comprising the following steps:
   (a) providing a first source of compressed air having a predetermined pressure to said combustion system; and
   (b) providing a second source of compressed air having a pressure greater than said first source of compressed air to cool said combustion system.

23. The method of claim 22, further comprising the step of originating said first source from said booster compressor.

24. The method of claim 22, further comprising the step of originating said second source from said intermediate compressor.

25. The method of claim 22, further comprising the step of originating said first source between adjacent stages of said intermediate compressor.

26. The method of claim 25, further comprising the step of originating said second source at an aft end of said intermediate compressor.

27. The method of claim 22, further comprising the step of cooling compressed air from said second source.

28. A gas turbine engine, comprising:
   (a) a compressor positioned at a forward end of said gas turbine engine having a plurality of stages, each said stage including a stationary compressor blade row and a rotatable blade row connected to a first drive shaft and interdigitated with said first compressor blade row;
   (b) a core system positioned downstream of said compressor, said core system further comprising:
      (1) an intermediate compressor positioned downstream of and in flow communication with said compressor connected to a second drive shaft;
      (2) a combustion system for producing pulses of gas having increased pressure and temperature from a fluid supplied to an inlet thereof so as to produce a working flow at an outlet thereof; and,
      (3) an intermediate turbine positioned downstream of said combustion system in flow communication with said working fluid, said intermediate turbine being utilized to power said second drive shaft;
   (c) a low pressure turbine downstream of and in flow communication with said intermediate turbine for powering said first drive shaft; and,
   (d) a load connected to said first drive shaft;
wherein a first source of compressed air having a predetermined pressure is provided to said combustion system and a second source of compressed air having a pressure greater than compressed air from said first source is provided to cool said combustion system.

* * * * *